US007761359B2

(12) United States Patent  
Sanwal et al.

(10) Patent No.: US 7,761,359 B2  
(45) Date of Patent: Jul. 20, 2010

(54) SYSTEM AND METHOD FOR OPTIMIZING INVESTMENTS WITHIN AN ORGANIZATION

(75) Inventors: Anand K. Sanwal, New York, NY (US); Arun K. Pandurangi, Tempe, AZ (US); Amith B. Nirgunarthy, Jersey City, NJ (US); Jaonne L. Neidow, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 442 days.

(21) Appl. No.: 11/256,340

(22) Filed: Oct. 21, 2005

(65) Prior Publication Data

US 2008/0021844 A1 Jan. 24, 2008

Related U.S. Application Data

(60) Provisional application No. 60/678,474, filed on May 6, 2005.

(51) Int. Cl.
*G06Q 40/00* (2006.01)

(52) U.S. Cl. .................................. 705/36 R

(58) Field of Classification Search .............. 705/35–40
See application file for complete search history.

(56) References Cited

U.S. PATENT DOCUMENTS

| 6,581,045 | B1 * | 6/2003 | Watson ..................... 705/400 |
| 2003/0033191 | A1 * | 2/2003 | Davies et al. ................ 705/10 |
| 2003/0158800 | A1 * | 8/2003 | Pisello et al. ............... 705/35 |
| 2004/0073443 | A1 * | 4/2004 | Gabrick et al. ............... 705/1 |
| 2006/0015425 | A1 * | 1/2006 | Brooks ...................... 705/35 |

\* cited by examiner

*Primary Examiner*—Olabode Akintola
(74) *Attorney, Agent, or Firm*—Snell & Wilmer L.L.P.

(57) ABSTRACT

A system, method, and computer program product for optimizing investments proposed by at least one business unit within an organization. First data predicting the performance of a first investment are stored in a database, the first data being calculated using at least one global assumption relating to an organization and actual data describing the performance of at least one other investment. Second data relating to a second investment are retrieved from the database. By comparing at least one metric computed from the first data to at least one metric computed from the second data relating to the second investment, where the metric is at least one of a financial metric and a strategic metric, a decision is made whether to approve the first investment.

21 Claims, 9 Drawing Sheets

FIG. 5

CBA Data Entry

Home  Main  Doc  Lookup  Help

→ 1
Active Events
2005_PLAN

Past Events
Reports

Events
Calculation ☐
Options
Exits

Last Date For Reporting: 05 Oct 2005

| Event Code-4 | Event Name | Event Status | Details |
|---|---|---|---|
| 2005_PLAN | 2005 CBA Plan Input | Open | Details |

Step 1: Complete the Input Investment Information sections
Step 2: View Investment Summary
Step 3: Send CBA to Approver
Click here for the BU General Information Page

| | |
|---|---|
| CBA 1 - Investment Overview Input<br>First you need to enter all information about your investment<br>Investment Overview Input | More Details<br><br><br>Stored - OK |
| CBA 2 - Investment Funding Input<br>How are you going to fund you investment? Please include all expenses in this form including the additional headcounts<br>Investment Funding Input | More Details<br><br><br><br><br>Stored - OK |
| CBA 3 - Investments Benefit Input<br>What benefits will this investment generate for the coming years?<br>Investment Benefit Input | More Details<br><br><br><br>Stored - OK |
| CBA 4 - Risk Rating Input<br>Risk Rating | More Details<br>Stored - OK |
| CBA 5 - Add Investment Documentation Backup<br>Documentation Backup | More Details<br><br>Stored - OK |
| IO Investment Prioritization | More Details<br>Stored - OK |
| Varmargin - Variable Margin Input<br>Variable Margin Input | More Details<br>Stored - OK |
| GBL margins<br>Global Margins | More Details<br>Not Opened |
| CBA Summary<br>CBA Summary | More Details<br>Stored - OK |

| CBA1 | CBA2 | CBA3 | CBA4 | CBA5 | CBA6 | VARMARGIN | GBLMARGINS | CBA SUMMARY |

CBA Data Entry — Home   Main   Doc   Lookup   Help

→ 1
Active Events
2005_PLAN
 Save/Refresh
 Reset
 <Prev Next>
 Past Events
 Approval
 Reports 5) Are there sufficient resources in place to implement the initialive?  [Selection C ▽]  601
A-Yes, the resources have been identified and are fully available.
B-The resources have been identified and are partially available.
C-The resources have not yet been identified and/or are not available.

6) Organization and Coordination Complexity  [Selection C ▽]  602
A-Initiative is easy to coordinate and does not have significant cross-functional involvement and/or interdependency.
B-Initiative is fairly complex to coordinate and requires some cross-functional involvement and/or interdependency.
C-Initiative is difficult to coordinate and requires significant cross-funtional involvement and/or interdependency.

7) What is the expected duration of technology development spent on the investment?  [Selection C ▽]
A-1 year / No technology spent on the project.      Selection A
B-> 1 year but less than or equal to 2 years.       Selection B
C-3 or more years.                                  Selection C
                                                       603

| If the score is between 1-1.39 then Low Risk |
| If the score is between 1.4-2.39 then Medium Risk |
| If the score is between 2.4-3.0 then High Risk |

| Calculated Risk Rating = 3 |
| This is a High Risk Investment |
| 604 |

Events
Calculation ☐
Options
Exits

| | CBA1 | CBA2 | CBA3 | CBA4 | CBA5 | CBA6 | VARMARGIN | BGLMARGINS |

CBA Approval  Home Main Doc Lookup Help

2005 PLAN

Pending Action

| Investment Name | TLFI (post SECM) | FTI | BB | HPV (pre SECM) | Payback | Status | Comments | Date Submitted | Submitted by | Risk Rating |
|---|---|---|---|---|---|---|---|---|---|---|
| Investment #1 | 2,790 | 1,700 | 561 | 1,100 | 1 | Resubmit ▷ | Looks agressive | 10/20/04 | Analyst #1 | 2.35 |
| Investment #2 | 3,130 | 2,100 | 854 | 1,700 | 2 | Approved ▷ | Great for Lead Generation | 10/20/04 | Analyst #1 | 2 |
| Investment #3 | 4,870 | 2,100 | 871 | 1,200 | 3 | Not Approved ▷ | Too risky | 10/20/04 | Analyst #1 | 3 |
| Investment #4 | 5,200 | 2,800 | 875 | 1,908 | 2 | Approved ▷ | | 10/20/04 | Analyst #2 | 1.15 |
| Investment #5 | 0 | 0 | 0 | 0 | 0 | ▷ | | | | |

702           703           704           705

701

History

| Investment Name | TLFI (post SECM) | FTI | BB | HPV (pre SECM) | Payback | Status | Comments | Date Submitted | Submitted by | Status Changed on | Risk Rating |
|---|---|---|---|---|---|---|---|---|---|---|---|
| Investment #6 | 2,456 | 1,519 | 513 | 1,019 | 1 | WP | Not on track with averages. | 10/18/04 | | 10/20/04 | 2.05 |
| Investment #7 | 2,100 | 630 | 348 | 540 | 2 | WP | Payback less than desired. | 10/12/04 | | 10/14/04 | 2.65 |
| Investment #8 | 2,910 | 1,691 | 600 | 0 | 0 | WP | Please back up with documentation. | | | | |

[< Previous] [Save Refresh] [Reset] [Next >]

| | C | D | E | F |
|---|---|---|---|---|
| | IO Information | Forecast | Actual | var xvar |
| | BU Name | QTR 1 | QTR 1 | QTR 1 |
| | Product Name | | | |
| | SPENDING | | | |
| | Average Spend per AIF | 3,004 | 5,613 | |
| | BASIC ATTRITION | | | |
| | Basic Voluntary Attrition | 20.4% | 15.3% | |
| | Bacis Collection Attrition | 2.2% | 2.4% | |
| | Basic Total Attrition | 22.6% | 17.7% | |
| | REVOLVE AND CREDIT | | | |
| | Good LOC | 4,223 | 4,441 | |
| | Good Utilization | 28.65% | 37.33% | |
| | Bad LOC | 3,336 | 3,735 | |
| | Bad utilization | 70.42% | 63.38% | |
| | Revolve Rate | 89.19% | 90.96% | |
| | %Bad to Write Off | 70.00% | 70.00% | |
| | BALANCE TRANSFER | | | |
| | Average BT Amount | 2,518 | 881 | |
| | Take Up Rate | 27.02% | 25.67% | |
| | *Revenues* | | | |
| | Finance Charge Revenue | 15.56% | 16.6% | |
| | Cost of Funds | (5.21%) | (5.35%) | |
| | Net Spread Revenue | 10.35% | 11.22% | |
| | Discount Revenue - Local TRS | 2.55% | 2.49% | |
| | Discount Revenue - Region TRS | 2.21% | 2.21% | |
| | Outbound spend | 12% | 12% | |
| | Billed Card fee (basic) | 0 | 35 | |
| | Billed Card fee (supp) | 0 | 0 | |
| | Assessments | 0.83% | 0.83% | |
| | Insurance | 0.94% | 0.94% | |
| | Total Revenue Per Account | 236.4 | 414.0 | |
| | *Expenses* | | | |
| | Fixed Expense Per Account | 16.17 | 16.17 | |
| | Operations Per Account | 71.5 | 72.6 | |
| | MR liability | 0.99% | 1.03% | |
| | Loyal cost/Account | 0.00 | 0.00 | |
| | COCMS/Account | 10.93 | 10.93 | |
| | Loss Provision | 2.6% | 2.6% | |
| | Other Upfront Costs | 0 | | |
| | Upfront Technology | 0 | | |
| | Total Expense Per Account | 386 | 199 | |
| | PTI Per Account | | | |

SYSTEM AND METHOD FOR OPTIMIZING INVESTMENTS WITHIN AN ORGANIZATION

CROSS REFERENCE TO RELATED APPLICATIONS

This application claims priority to, and the benefit of, U.S. Provisional Patent Application Ser. No. 60/678,474, filed May 6, 2005, which is hereby incorporated by reference in its entirety.

BACKGROUND OF THE INVENTION

1. Field of the Invention

The present invention generally relates to systems, methods, and computer program products for optimizing investments, and more particularly to systems, methods, and computer program products for prioritizing and choosing investments.

2. Related Art

A large fraction of the activities of a typical organization are discretionary activities designed to increase the organization's future profits. Commonly, such activities receive investment funding collectively, without being examined on their individual merits. In conventional budgeting processes, financial resources are budgeted to divisions of an organization, subunits of the organization, specific product lines, or individual projects within the organization (collectively referred to as "business units") based on past activities. The resulting contest for funding can distort the behavior of business units, encouraging them to maximize their own performances at the possible expense of the overall organization.

Typically, to allocate funding for such activities, decision-makers within an organization draw up budgets on a regularly scheduled basis. Budgeting is an important event in an organization. First, a business unit may prosper if it gets enough funding or wither if it does not. Second, because such funding is desirable, business units compete for it, changing their activities in the hope of attracting more funding. Thus, the rules by which an organization's budgets are allocated can strongly affect how business units operate.

In many organizations, the budgeting process is ineffective and possibly even counter-productive. At the beginning of each budget period, a decision-maker evaluates the overall performance of a business unit. The decision-maker may then increase or decrease the budget of the business unit for the upcoming period. The business unit's previous budget, to which the decision-maker makes adjustments, depends on the history and results of such decisions over earlier budget periods. Thus, as a general matter, business units receive investment funding based on a historical allocation process related to their past performances. As a result, the typical process encourages business units to maximize their own performances.

Budgets determined in this way bear no direct relation to how much the business units contribute to the performance of organization as a whole. Often, it is difficult even to measure their contributions. Because different business units describe and assess their investments differently, they usually cannot be compared. Further, the typical budgeting process does not include a detailed examination of the performance and impact of each investment by a business unit. Rather, each business unit is judged simply by its overall performance.

Also, such budgets typically do not reflect how much funding business units actually need for their planned activities. Business units will receive more funding in future budgets only if their performances appear to justify their current budgets. Therefore, business units will commonly expand their activities to use however much funding they have been given. They do this with little consideration for how their activities will affect the whole organization. In addition, they can receive more funding whether or not they have made adequate plans for the next budget. Because of this process, organizations often fund business units not because of how their future activities will increase profit, but because of how successful their past activities have been.

Thus, conventional budgeting processes do not ensure that investments are planned to increase the profit of a whole organization. Rather, they encourage business units of the organization to maximize their own past performances. Given the foregoing, what are needed are a system, method, and computer program product for optimizing investments across an organization by comparing predictions of the performances of each of the investments within an organization.

BRIEF DESCRIPTION OF THE INVENTION

The present invention meets the above-identified needs by providing a system, method and computer program product for optimizing investments proposed for at least one business unit within an organization.

In accordance with one embodiment of the present invention, there is provided a system, method, and computer program product for optimizing investments proposed by at least one business unit within an organization. First data predicting the performance of a first investment are stored in a database, the first data being calculated using at least one global assumption relating to an organization and actual data describing the performance of at least one other investment. Second data relating to a second investment are retrieved from the database. At least one metric computed from the first data is compared to at least one metric computed from the second data relating to the second investment, wherein the metric is a financial metric or a strategic metric.

An advantage of the present invention is that it standardizes how different business units within an organization value their investments. As a result, the organization is able to compare investments from different business units, regions, and markets. By doing so, it can allocate resources more effectively.

An additional advantage of the present invention is that it enables entities to submit their investments for approval throughout the organization. As a result, entities are made more accountable for having their investments fulfill their predictions.

An additional advantage of the present invention is that, through its integration with tracking systems, it uses historical results to inform the calculation of data predicting the performance of investments. As a result, such predictions are more accurate.

An additional advantage of the present invention is that by causing more accurate predictions, it enables an organization to allocate its resources more effectively.

An additional advantage of the present invention is that, through its integration with tracking systems, data predicting performance can be recalculated based on the results a business unit has actually achieved with an investment. By comparing predicted and actual performance, an organization can give more funding to business units that fulfill their predictions.

An additional advantage of the present invention is that by centralizing the approval workflow and the use of global assumptions, it increases the integrity of data and reduces calculation errors.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings. The left-most digit of a reference number identifies the drawing in which the reference number first appears.

FIG. 5 is an image illustrating a step of receiving input data relating to a proposed investment in a process for optimizing investments, the image being a screenshot from a computer terminal used according to an embodiment of the present invention.

FIG. 6 is an image illustrating a step of computing a strategic metric in a process for optimizing investments, the image being a screenshot from a computer terminal used according to an embodiment of the present invention.

FIG. 7 is an image illustrating a step of deciding whether to approve an investment in a process for optimizing investments the image being a screenshot from a computer terminal used according to an embodiment of the present invention.

FIG. 8 is an image illustrating a step of retrieving data relating to an investment in a process for optimizing investments, the image being a screenshot from a computer terminal used according to an embodiment of the present invention.

DETAILED DESCRIPTION

I. Overview

Figure 1:
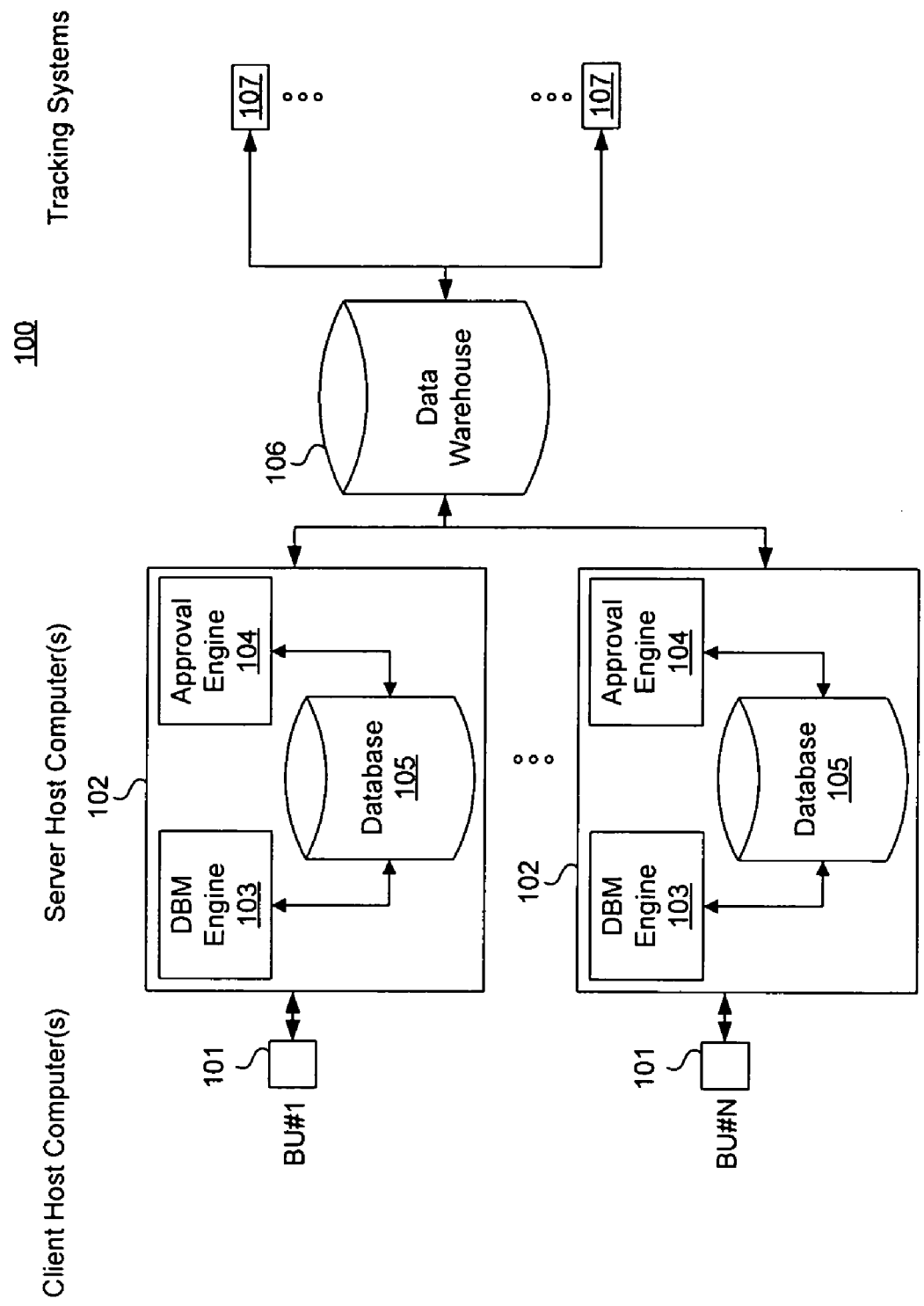
FIG. 1 is a system diagram of an exemplary investment optimization system in which the present invention, in an embodiment, would be implemented.

The present invention is directed to a system, method and computer program product for optimizing investments among and between business units within a for-profit, public or private organization. The present invention is now described in more detail herein in terms of the above exemplary systems and processes. This is for convenience only and is not intended to limit the application of the present invention. In fact, after reading the following description, it will be apparent to one skilled in relevant arts how to implement the following invention in alternative embodiments (e.g., an organization other than a for-profit company).

Generally, an investment is an expenditure of a resource, such as for example a discretionary expenditure of a financial resource. Investments may include, but are not limited to, capital expenditures to buy equipment or software, advertising or marketing expenditures, expenses for travel to visit clients, costs of hiring employees, and research and development expenditures. An organization or a business unit of an organization generally makes investments for the purpose of increasing the future profitability of the organization.

In the context of the present invention, prediction data are data predicting the performance of an investment. Such prediction data are generated before the investment is funded and may include, but are not limited to, information on the scope, size, content, and cost of a proposed investment; predictions of the expected results of the proposed investment; financial metrics characterizing the financial cost and benefit of the investment; and strategic metrics that qualitatively describe the importance, strategic impact, and riskiness of the investment.

Actual data are data generated after an investment is funded which quantitatively describe the course of real events that result from the investment. Actual data may include, but are not limited to, the actual cost of the activities required to carry out an investment; the responses of customers, suppliers, or employees to the activities; the revenue resulting from the investment; and the cost of financing the investment.

Global assumption data are data used as input for quantitative variables that an organization specifies shall be used in all calculations using those quantitative variables. In particular, global assumptions are data used to calculate the prediction data. Such assumptions are supported by analysis, drawing on experience, peer comparisons, market research, test results, and the like. A global assumption can be the same value as a corresponding variable outside the organization, such as the Federal funds rate or the current exchange rate for a pair of currencies. Alternatively, a global assumption can be the same value as a financial metric particular to an organization as a whole, such as the interest rate that the organization must pay on its debt. As yet another alternative, a global assumption can be a value internal to an organization, such as an overhead cost that an organization imposes for calculating the cost of employees. It is also possible for a global assumption to be used only with prediction data from a particular business unit.

The terms "user," "end user", "requester", "decision-maker" and/or the plural form of these terms are used interchangeably throughout herein to refer to those persons or entities capable of accessing, using, being affected by and/or benefiting from the tool that the present invention provides for optimizing investments within an organization.

II. System

Referring to FIG. 1, a system diagram of an exemplary investment optimization system 100 in which the present invention, in one embodiment, would be implemented is shown. It should be understood that the example system 100 is shown for illustrative purposes only and does not limit the invention. In fact, after reading the following description, it will be apparent to one skilled in relevant arts how to implement the invention in alternative embodiments.

System 100 includes a server host computer 102 programmed to receive investment proposal data from a client host computer 101 and to process that data. A requestor (e.g., an analyst for a financial institution) enters investment proposal data on client host computer 101, such as for example through the requestor's desktop computer. As shown in FIG. 1, system 100 may include additional server host computers 102 which receive investment proposal data from additional client host computers 101, up to an N-th business unit ("BU").

Server host computer 102 includes a driver-based model ("DBM") engine 103 for interacting with client host computer 101. Based on the information provided by the client host computer 101 and previously stored global assumptions and actual data, DBM engine 103 calculates prediction data using computer logic customized for the business unit based on that unit or the organization's experience. Thus, the particular logic used to calculate prediction data can be unique from business unit to business unit and on a larger scale from organization to organization.

Generally, the investment data for a proposed investment includes the scope, size, content, and cost of the proposed investment. Investment proposal data also may include predictions of the expected results of the proposed investment. The particular financial metrics characterizing the financial cost and benefit of the investment, as well as the strategic metrics that qualitatively describe the importance, strategic impact, and risk of the investment may also be included.

The particular format of the investment proposal data information may be predetermined prior to its input, and in such a case, a requester can, for example, fill in a form provided on a Web page the required investment information by entering keystrokes in a computerized form, which can be a spreadsheet, a database record, a Web browser form, and the like. Investment proposal data also can be transferred from client host computer 101 to server host computer 102 as a file. Alternatively, the requestor at a terminal on client host computer 101 sends an e-mail message containing investment proposal information.

Alternatively, if the investment proposal information can be provided unformatted (e.g., in free-text form), in which case the request information will be further processed by parsing it to extract the relevant information. Again, the information can be input in one format and converted using a conversion engine (not shown) to another predetermined format.

Server host computer 102 also includes an approval engine 104 for registering decisions to approve or not to approve investments. Approval engine 104 receives input from a user with authority to approve an investment, request additional information for a proposed investment, and the like. Such a user is also referred to herein as an "decision-maker." Approval engine 104 may also be automated to perform predetermined computer logic operations on the prediction data generated by DBM engine 103, the investment proposal data, previously stored actual data, and global assumptions or a combination thereof The particular computer logic executed to determine whether an investment proposal is approved depends on the type of investment and business model of either the business unit or organization.

In addition, approval engine 104 can be configured to communicate a portion of the investment proposal related information only to predetermined individuals. For example, an investment proposal related to credit cards can be directed to a particular director within the credit card business unit with authority to review certain metrics of an investment.

In another embodiment of the present invention, decision-makers have different levels of approval authority. For example, one decision-maker may be designated as having authority to override the decisions of one or more other decision-makers. In such a case, the present invention removes a pending investment request from the other decision-makers' queues if the decision-maker with authority to override makes a decision. It may also be the case that only certain authorized decision-makers are permitted to modify the approval status of a proposed investment. Authority to add or modify global assumptions, actual data and the like, may also be limited to authorized users.

System 100 also includes a data warehouse 106, such as a mainframe computer, a server, a distributed network of computers, and the like, for storing data relating to investments. Such information includes, but is not limited to, prediction data, previously generated prediction data, actual data describing the performance of previously-proposed and approved investments, global assumptions, approval information, and status of a proposed investment.

Access to data warehouse 106 is controlled. A requestor, for example, has limited access to the records stored on data warehouse 106, such as access only to modify investment proposal data before submission for review and to view the proposal's status. Access may also be given to view actual data. A decision-maker may also have limited access to investment proposal records stored on data warehouse 106 to view, for example, similar types of proposed investments to assist in making a decision. Further, only authorized persons can make changes to global assumptions stored on data warehouse 106. The same type of access restriction exists with respect to other databases on system 100.

As shown in FIG. 1, a single data warehouse 106 is in communication with server host computers 102. Server hosts computers 102 can also include a local database 105 for storing investment proposal related data, and thus it may be the case that data in data warehouse 106 may be a mirror image of portions of the information on database 105. Similarly, investment related data can be stored in other databases located throughout system 100, and fed to the appropriate host computer or data warehouse 106 (or database 105) as needed. For example, client host computer 101 may include a database (not shown) for storing global assumptions used within a business unit (represented as BU#1 through BU#N). Similarly, actual data of existing or past investments can be stored on the client, or in any of the aforementioned databases.

Data warehouse 106 is also in communication with tracking system 107. Tracking system 107 feeds data warehouse 106 actual data describing the performance of current (or past) investments. As shown in FIG. 1, multiple tracking systems 107 can be implemented to track actual data to from various sources.

Tracking system 107 can be implemented within system 100 in different configurations. For example, instead of tracking system 107 being in communication with server host computer 102 through data warehouse 106, server 102 can include a local tracking system. Similarly, a client host computer 101 may be in communication with another tracking system. Tracking system 107 also can be configured to handle only certain types of investments. In yet another configuration tracking system 107 can be in direct communication with several business units to receive actual data from several different sources. Tracking system 107 can be configured to update actual data continually, at predetermined periods, or in response to the occurrence of predetermined events.

III. Process

Figure 2:
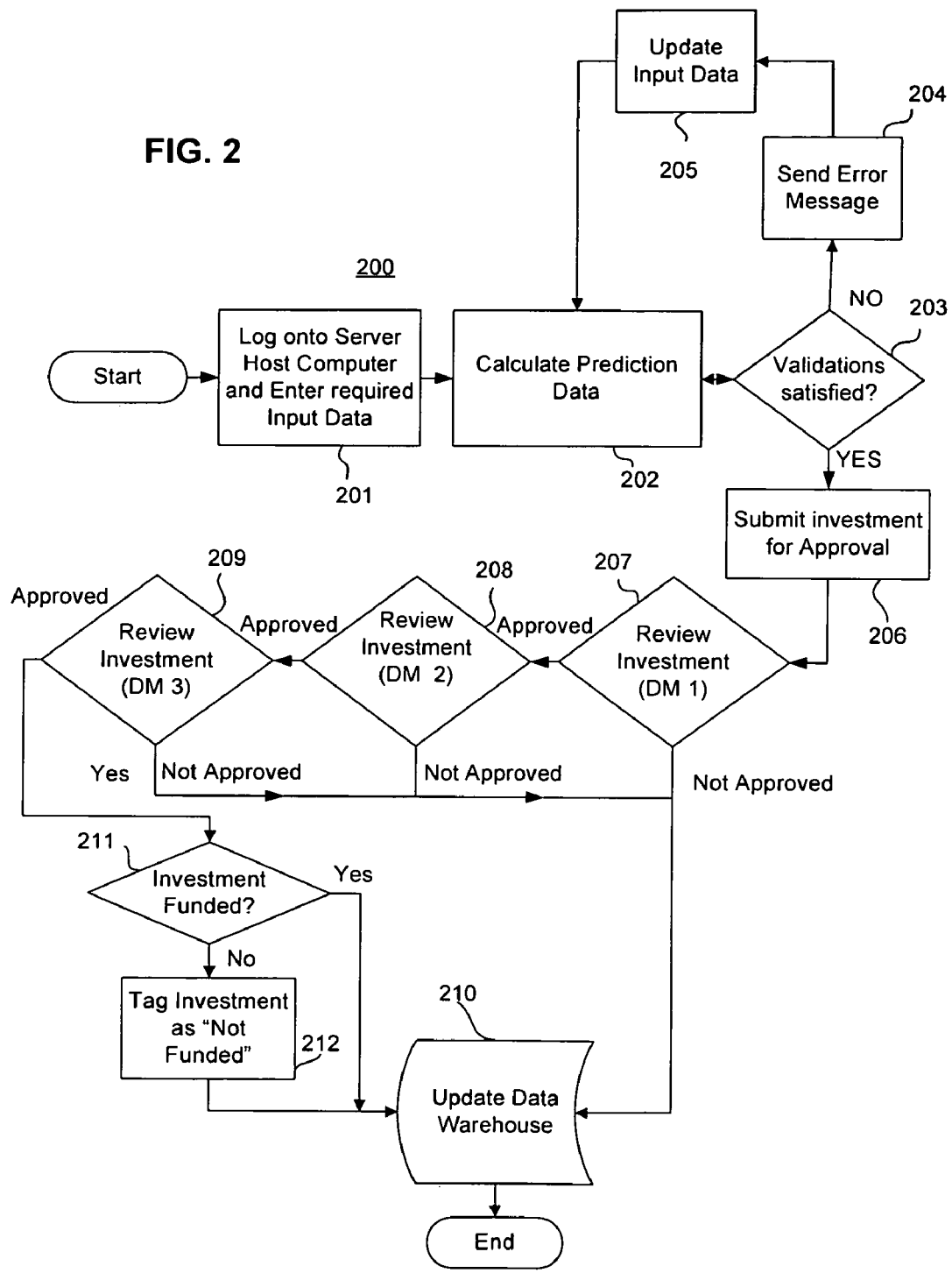
FIG. 2 is a flowchart illustrating a process for optimizing investments by receiving, reviewing, and storing prediction data, the data being verified to conform to standards, according to an embodiment of the present invention.

Referring to FIG. 2, a flow diagram of an exemplary process for optimizing investments by receiving, validating, storing, and reviewing prediction data, according to one embodiment of the present invention, is shown.

Process 200 begins with step 201, in which a user within a business unit (also referred to herein as a "requestor") who has conceived of an investment establishes a connection between client host computer 101 and server host computer 102 and logs onto DBM engine 103. Once logged on, the requestor inputs information that is required by DBM engine 103. In one embodiment of the present invention, the requestor inputs information by entering keystrokes in a computerized form, which can be a spreadsheet, a database record, a Web browser form, and the like. In another embodiment, the requester transfers a file containing investment proposal information to DBM engine 103. In yet another embodiment, the requestor sends an e-mail message containing information to the DBM engine 103. Other methods of inputting information, known in relevant arts, are included within the scope of the invention.

The particular investment proposal data input to system 100 depends on the requirements of a particular business unit or organization. For example, one business unit may require input data describing what activities and costs a proposed investment entails as well as estimates of the results of the activities. Another business unit may further require data relating to the proposed source of funding for the investment. Thus, input requirements may be different from one investment type to another or from business unit to business unit. In addition, responses to the standardized questions are also required. These standardized questions are the same across the organization and are required input for all investment proposals.

While fields may be provided for entering unstructured input (e.g., free-text remarks as to the viability of the proposed investment), a requestor is required to answer certain predetermined questions. Some of these questions are standardized across the organization. Requiring the requestor to respond to such standardized questions, and using the aforementioned actual and global assumptions data, as well as limiting the requestor's ability to modify certain data (e.g., actual data or global assumption data), the present invention makes it difficult if not impossible for a requestor to adjust outcome of the approval process illegitimately. Accordingly, the present invention provides a way of ensuring compliance with government and organization requirements. In addition, the present invention further facilitates investment optimization by providing consistent prediction data based on actual data and predetermined global assumption data.

In step 202, as the requestor inputs information, DBM engine 103, having received the information, calculates prediction data such as predicted profit and loss and related metrics using algorithms previously designed and stored in database 105 for this purpose. DBM engine 103 uses global assumption values for certain variables and actual data, on previous, similar investments, in the algorithms to predict the results of the received investment. Global assumption and actual data are supplied to the DBM engine 103 from data warehouse 106, database 105, or a combination of both.

In step 203, after the requester has input information and DBM engine 103 has calculated prediction data, the investment proposal data and prediction data are verified to ensure that they conform to the standards established by the organization. Limits on the values of such data can be stored in data warehouse 106, database 105 or a combination of both. Standards include, for example, requirements to supply certain kinds of information, specifications about the format of information, restrictions on the content, size, and scope of investments in general or of investments by a particular analyst, and other rules established by the organization for investments. If the data (either the inputted data or the calculated prediction data, or a combination of both) do not conform to the standards, DBM engine 103 returns an error message, as shown at step 204. Upon receipt of the message, the requester may input additional information or modify the information already input at step 205. Based on the updated data, DBM engine 103 recalculates the prediction data at step 202.

If a determination is made at step 203 that the data conforms to the standards, at step 206 the prediction data are fed to approval engine 104 which includes computer logic for managing the approval process. In steps 207, 208 and 209, approval engine 104 communicates investment related data and accepts input from multiple decision-makers ("DM" in FIG. 2). The decision-makers use approval engine 104 to review the prediction data, data relating to other pending or past investments, and the like and provide a decision on the proposed investment. As described above, different decision-makers may have different authorities. In addition, individual decision-makers may be designated to review only certain types of investment proposals or specific types of data. For example, one decision-maker may review strategic metrics while another reviews financial metrics. In addition, the number of decision-makers required to make an approval determination can vary.

A decision maker may also return to the requestor recommendations for changes in the proposed investment. This may entail sending an e-mail, sending data over a network from one processor to a separate computer, transferring data within a single computer, and the like.

In step 210, if the investment proposal has been rejected, the investment is tagged as "not approved." In certain cases, even though the investment proposal may be approved, the funding available may be insufficient to execute it. Accordingly, if a determination is made at step 211 that an approved investment is not funded, then that investment proposal is tagged at step 212 as "approved—not funded." If a determination is made at step 211 that the investment is funded then the proposal is tagged simply as "approved." In either case the decision is recorded in data warehouse 106 at step 210.

Figure 3:
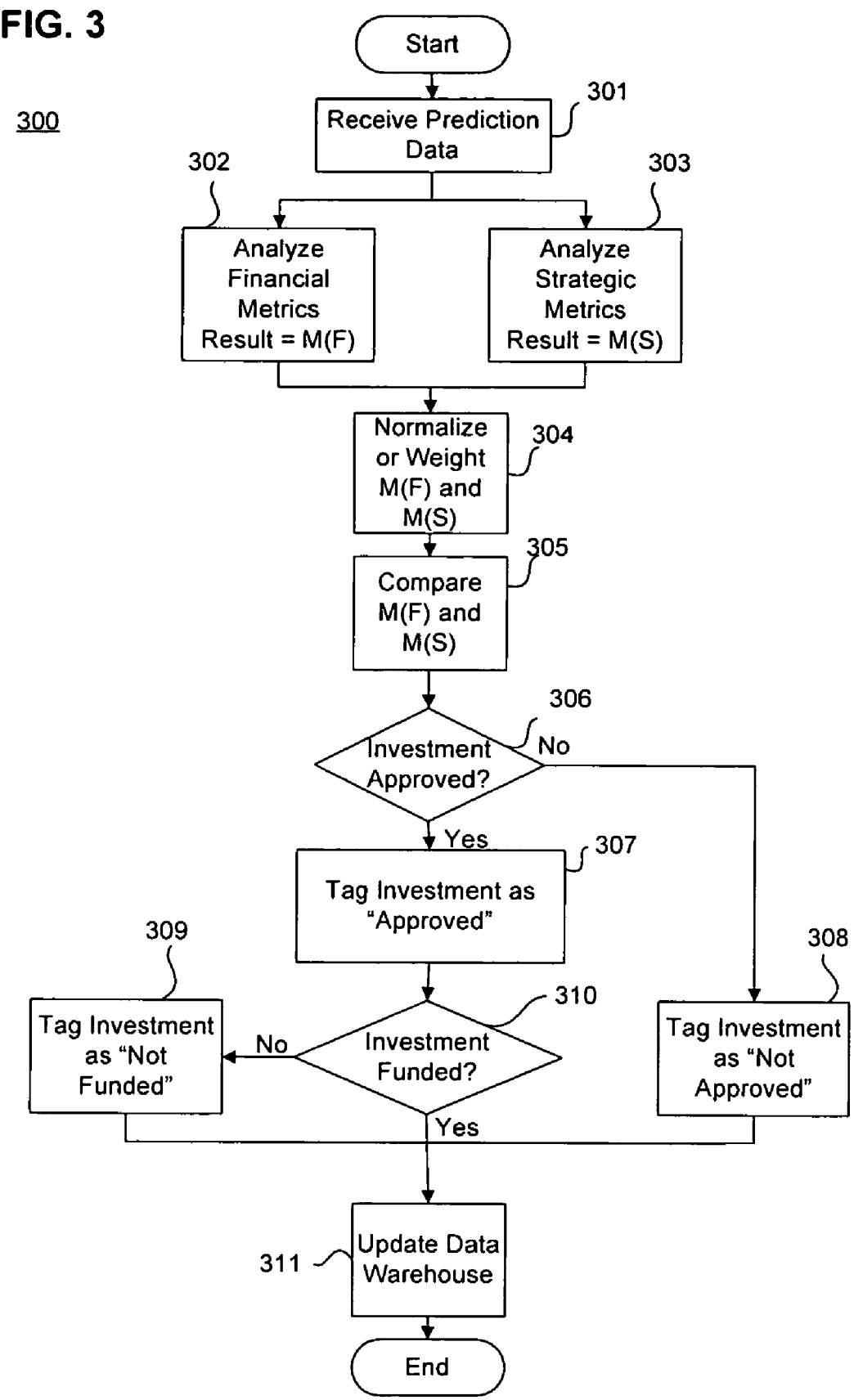
FIG. 3 is a flowchart illustrating a process of deciding whether to approve an investment by reviewing prediction data, according to one embodiment of the present invention.

Referring to FIG. 3, an exemplary decision process 300 for deciding whether to approve an investment, according to one embodiment of the present invention, is shown. Process 300 begins at step 301, in which the prediction data are received from, for example, data warehouse 106.

In one embodiment of the present invention, two sets of metrics are reviewed, financial and strategic. In step 302, financial metrics are computed by DBM engine 103 from the various data stored in data warehouse 106, a result of processing the set of data being referred to as M(F). The result M(F) can be a single numeric value or a set of values resulting from the processed metrics. The particular financial metrics can include the total cost predicted for the investment, the total revenue predicted to result from the investment, the profit predicted to result from the investment, the net present value of the predicted revenue or profit stream, the return-on-investment, and the like.

Similarly, the strategic metrics are computed by DBM engine 103 from the various data stored in data warehouse 106, a result of processing the set of data being referred to as M(S). The result M(S) can be a single numeric value or a set of values resulting from the processed metrics. The strategic metrics can include the amount of the organization's assets that would be dedicated to the business unit if the investment were funded, the risk level of the investment, the strategic benefits of the investment, and the like.

In both cases, the particular financial or strategic metrics are computed on DBM engine 103 based on predetermined computer logic. Approval engine 103 communicates the metrics, once calculated, to the appropriate decision-maker for review. For example, the value(s) of each metric can be provided on a Web page, formatted into a spreadsheet, a database record, and the like. Additionally, the metrics can be transferred to a decision maker's host computer as a file. Alternatively, approval engine 103 can be programmed with computer logic to compute a decision based on predetermined computer logic. The particular logic may vary in accordance with the type of investment or organization requirements, and as described above can be customized for the business unit's or the organization's experience.

Weightings of metrics may vary according to investment type and management judgment. Accordingly, if necessary, the metrics are normalized to remove any biasing or weighted to add biasing in step 304. For example, an investment may be predicted to have a high return-on-investment but be very risky. If it is too risky, the decision-maker may refuse to approve it. In this example, the weight of the return-on-investment and riskiness metrics would be adjusted accordingly.

The results of both the financial and strategic metrics are compared in step 305. At step 306, a determination is made whether a proposed investment is approved or not approved. If a determination is made that an investment is approved, then that investment is tagged as "approved" at step 307. If a determination is made not to approve the investment, then the investment proposal is tagged as "not approved" at step 308. If an investment is approved, but a determination is made at step 310 that no funding is available, then at step 309 the proposed investment is tagged as "not funded." At step 311, the outcome is recorded in data warehouse 106.

Similarly, the present invention can compare financial metrics of a first investment proposal to financial metrics of another investment proposal (as opposed to the metrics of an existing or past investment). The particular comparisons depend on the investment type. For example, for certain types of investments the costs and the net present values of the two investments are compared. As another example, the revenue streams over time of the two investments are compared.

In other embodiments, the decision-maker takes no action with respect to the second investment. For example, the second investment may serve only as a benchmark against which to compare the first investment. In some embodiments of the present invention, more than two investments can be compared simultaneously.

Figure 4:
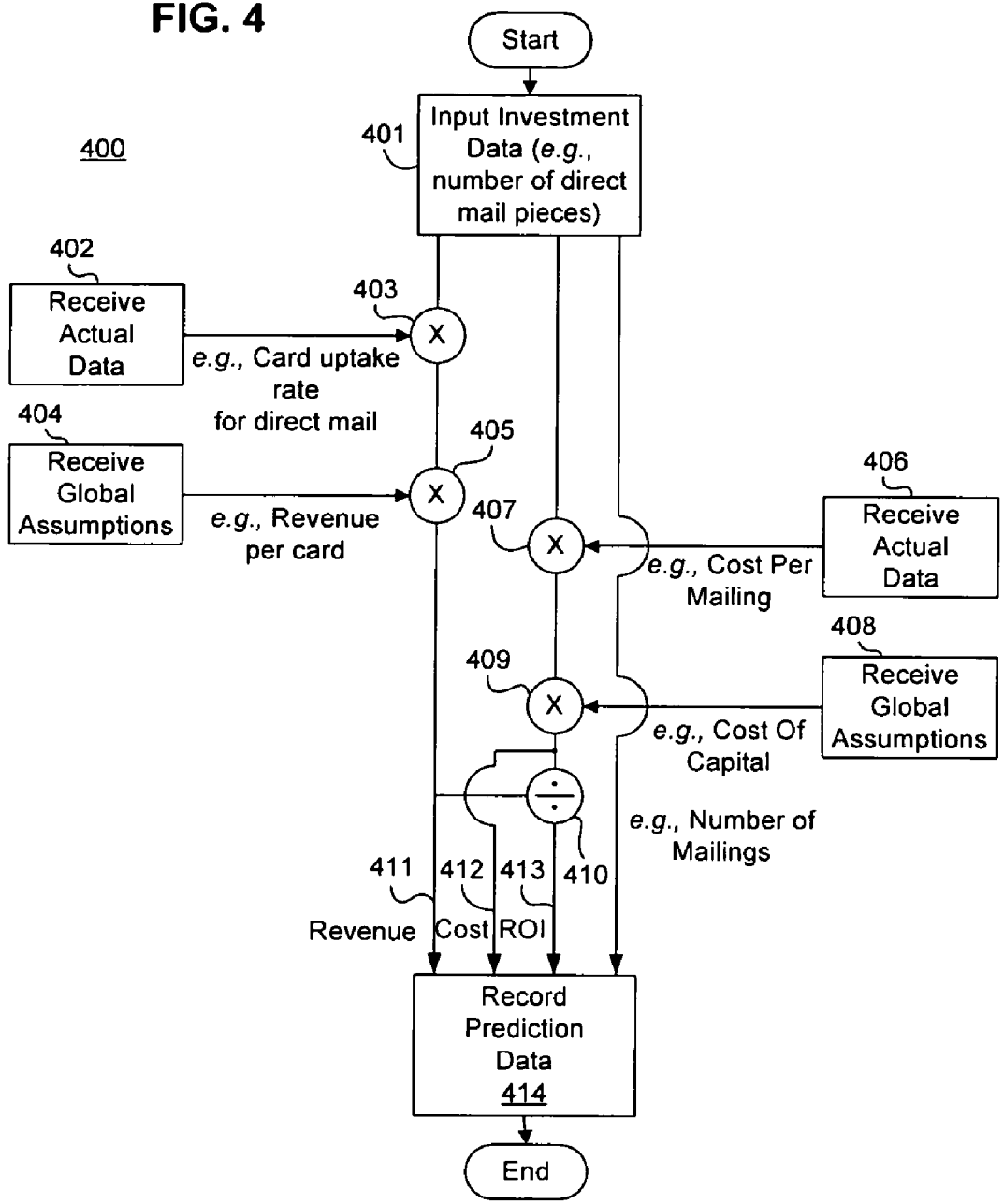
FIG. 4 is a flowchart illustrating a process for calculating prediction data using global assumptions and actual data, according to an embodiment of the present invention.

Referring to FIG. 4, an example of a process 400 for calculating prediction data, according to one embodiment of the present invention, is shown. This example is not meant to limit the invention, but rather is provided as an illustrative example. Many other processes known in the art can calculate such data.

Process 400 calculates prediction data for a particular proposed investment (e.g., engaging in a direct mail campaign in order to solicit consumers to sign up for a credit card). To begin the process, at step 401 a requestor connects to DBM engine 103, through for example client host computer 101 and inputs investment proposal information. In this example, the information characterizes the size of the investment as the number of direct mail pieces to be sent.

In step 402, actual data collected by tracking systems 107 are supplied to DBM engine 103 to be used in the calculation, namely the card uptake rate for direct mail (i.e., the rate at which direct mail recipients respond positively by applying for credit cards). This rate is known to the organization based upon the experience of past investments and is stored in an appropriate database, such as for example a database corresponding to data warehouse 106. In step 403, the number of direct mail pieces is multiplied by this rate to yield the predicted number of customers.

In step 404, a global assumption, namely the revenue per credit card customer, is supplied for use in the calculation. This global assumption can relate to a business unit within an organization. Once again, this assumption, known in the organization, is stored in an appropriate database, such as for example data warehouse 106. The predicted number of customers is multiplied by this assumption value in step 405 to yield the predicted revenue for the investment 411.

In step 406, actual data are supplied for use in the calculation, namely the cost per piece of direct mail. The number of direct mail pieces is multiplied by this cost in step 407 to yield the predicted expenditure for the investment.

In step 408, a global assumption, the cost of capital, is supplied for use in the calculation. This global assumption can relate to a whole organization. The predicted expenditure of the investment is multiplied by this cost in step 409, yielding the predicted financial cost of the investment 412.

In step 410, the predicted revenue is divided by the predicted financial cost to yield the predicted return-on-investment ("ROI") for the investment 413.

Accordingly, the prediction data include the number of mailings input in step 401; the predicted revenue, 411; the predicted financial cost, 412; and the predicted ROI, 413. This data is fed to approval engine 104, to data warehouse 106, and optionally to a database maintained by a business unit 105.

FIG. 5 depicts a screenshot 500 of an investment proposal input window for receiving information related to a proposed investment. In this example, screen 500 is a cost benefit analysis ("CBA") index window which directs a user to different CBA data entry or summary windows. In particular, screen 500 includes tabs at the bottom of the screen, labeled CBA1, CBA2, CBA3, CBA4, CBA5, CBA6, VARMARGIN, GBLMARGINS and CBA SUMMARY. Server host computer 102 hosts windows corresponding to each of these tabs to interact with a user on a terminal on a host computer such as client host computer 101. By selecting a tab, a user is directed to corresponding windows which have input fields for the user to fill in. Alternatively, the windows communicate related summary information.

Referring to FIG. 5, the description for each window is noted above the tabs. For example, when selected, CBA1 tab directs a user to an investment overview input screen where the user inputs data related to the investment, such as its scope of the investment. As another example, tab CBA2 directs the user to an investment funding window having fields requiring input related to predicted costs of funding the investment. Tab CBA3, for example, directs a user to a window for inputting investment benefit data, such as revenue and strategic benefits. Tab CBA 4 directs the user to a window for inputting risk information for the investment. Tab CBA 5 allows a user to add an additional investment proposal. As those skilled in the art will appreciate, the aforementioned tabs are examples of information required for a particular investment proposal. They do not exhaust the information that may be needed to characterize an investment. Screen 500 also indicates the status of whether the input data has been stored on data warehouse 106. An indicator "stored—OK" means that the information has been input and is ready to be processed further by either DBM engine 103 or approval engine 104.

FIG. 6 depicts a screenshot of an exemplary window 600 for both accepting from a user input for a proposed investment and providing a summary of the proposed investment's risk rating. As shown, questions are presented to the user (in this case a requestor proposing an investment) and the user has selection menus 601, 602 and 603 from which to select a response. Upon submitting the responses, DBM engine 103 calculates a risk rating, and the risk rating is analyzed by approval engine 104 as described above.

FIG. 7 depicts a screenshot of an exemplary window for communicating prediction data to a decision-maker and for accepting input from a decision-maker. Server host computer 102 hosts window 700. More particularly, the window is supplied by the approval engine 104 to interact with a user on a terminal on a host computer such as client host computer 101. Each line of the "Pending Action" table displays data for an investment. Column 701 shows the names of several investment proposals that a decision-maker may review. The investments proposals have been input by several requesters, which are named in column 704. Column 702 shows financial metrics relating to the several investments, while column 705 displays a strategic metric, the risk rating, relating to the several investments. The status of each investment is shown in column 703, which can be modified by an authorized decision-maker by making a selection from a pull-down menu. In addition, a decision-maker can request additional information in the form of free text in the "Comments" field, and select "Resubmit.

Upon entering this information and submitting the form, the appropriate information will be transmitted to the corresponding requestor. It should be understood that the prediction data illustrated in FIG. 7 are examples of data used for determining whether to move forward with an investment. The underlying formulas used to perform operations on the data are either well known in the art or customized for the business unit based on that unit's or the organization's experience. These formulas are executed by a component on server host computer 102, such as DBM engine 103 (to calculate prediction data) or approval engine 104 (to assist a decision maker or actually make the decision using computer logic).

In the exemplary window depicted in FIG. 7, a decision-maker has reviewed investments 1, 2, 3, and 4, and has approved investments 2 and 4 and rejected investment 3. Investment 1 has been sent back to the entity that input it with recommendations for changes. The decision-maker has not yet reviewed investment 5.

FIG. 8 depicts a screenshot of a window 800 which a decision-maker uses to review a proposed investment. Such a terminal may be in communication with a processor corresponding to approval engine 104. Image 800 shows a table with four columns, labeled "Forecast QTR 1", "Actual QTR 1", "var QTR 1", and "% var QTR 1". The table includes multiple rows, each row having a label shown to the left of the table. Window 800 is hosted by server host computer 102 with data supplied from both DBM engine 103 and tracking system 107 to show comparisons of projections based on input of prediction data to the DBM engine and actual data recorded by tracking system 107. In addition, the screenshot illustrated in FIG. 8 shows the difference between what was forecasted to what actually has been achieved. The present invention can also be configured to provide a user with other available information as well as other statistical calculations.

In the exemplary window 800 shown in FIG. 8, the column labeled "Forecast QTR1" shows data predicting the performance of an investment that was previously proposed and approved. The data include information characterizing the nature of the investment, such as the "Average Spend per Account in Force (AIF)"; prediction data, such as "Basic Attrition" (e.g., reduction in a business unit's or organization's customer population that happened as a result of normal turnover or because of some specific event), "Revolve and Credit", and "Balance Transfer"; predictions of the financial benefits of the investment such as "Revenues"; and predictions of the cost of the investment, such as "Expenses".

The column labeled "Actual QTR 1" shows actual data describing the performance of the investment in the course of events. The columns labeled "var QTR 1" and "% var QTR 1" have not yet been calculated at the moment illustrated by image 800. A processor will compare the data predicting the performance of the investment and the actual data for the investment to compute data for these two columns.

IV. Example Implementations

The present invention (i.e., system 100, processes 200, 300, 400, 500, 600, 700, 800 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, in any of the operations described herein which form part of the present invention. The operations may instead be machine operations. Useful machines for performing the operation of the present invention include general purpose digital computers or similar devices.

Figure 9:
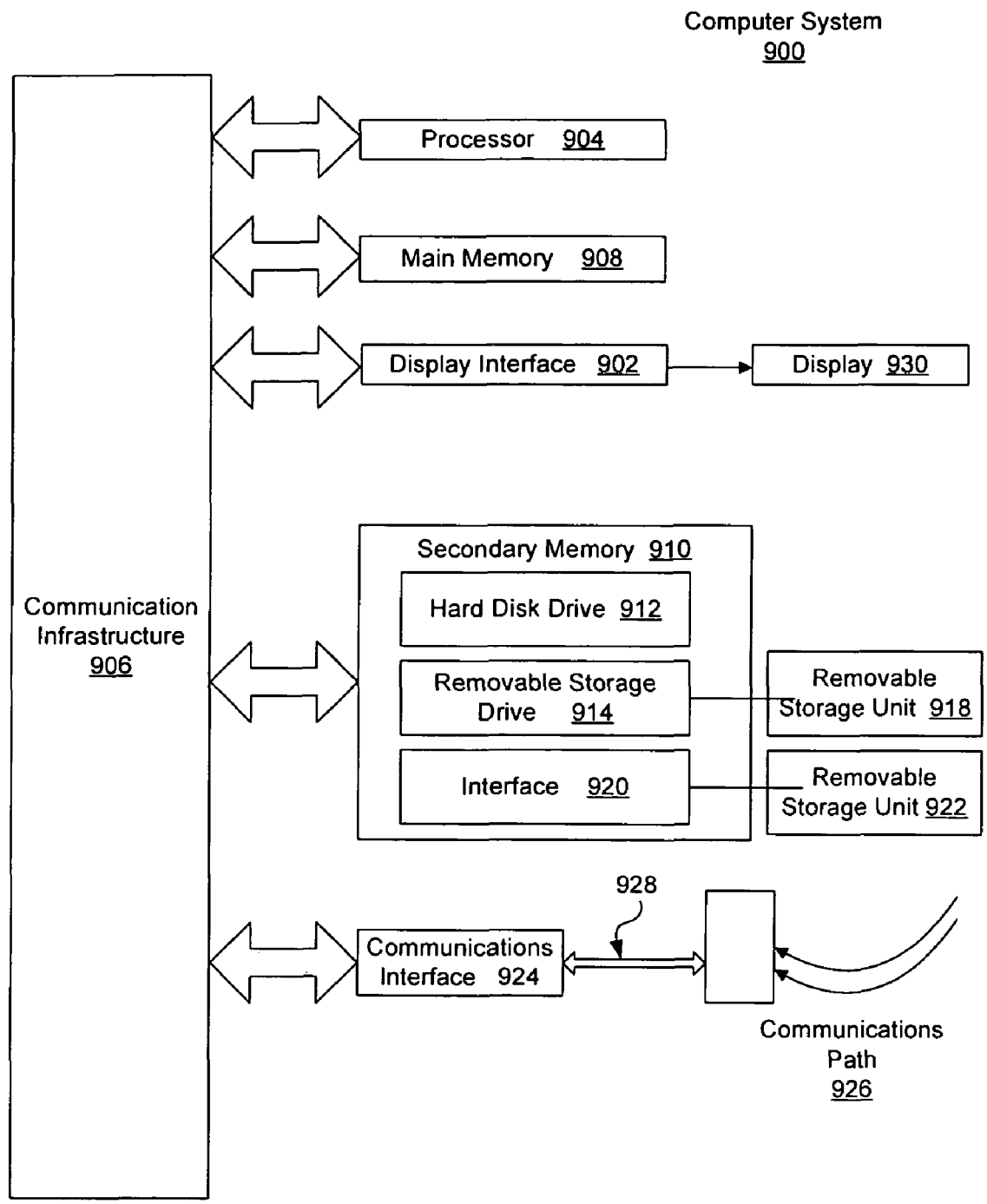
FIG. 9 is a block diagram of an exemplary computer system useful for implementing the present invention.

In fact, in one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in relevant arts how to implement the invention using other computer systems and/or architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in relevant arts.

In yet another embodiment, the invention is implemented using a combination of both hardware and software.

V. Conclusion

While various embodiments of the present invention have been described above, it should be understood that they have been presented by way of example, and not limitation. It will be apparent to persons skilled in relevant arts that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for optimizing investments proposed for at least one business unit within an organization, said method comprising the steps of:
    storing first data predicting the performance of a first investment in a database, the first data being calculated using at least one global assumption relating to an organization and actual data describing the performance of at least one other investment;
    retrieving second data relating to a second investment from the database;
    comparing, via at least one processor, at least one metric computed from the first data to at least one metric computed from the second data, wherein the at least one metric computed from the first data and the at least one metric computed from the second data are both at least one of a financial metric and a strategic metric; and
    determining whether to approve the first investment based at least in part on the comparing.

2. The method for optimizing investments of claim 1, further comprising the step of:
    updating the actual data.

3. The method for optimizing investments of claim 1, wherein the at least one global assumption is stored in the database.

4. The method for optimizing investments of claim 1, wherein the second investment is an existing investment.

5. The method for optimizing investments of claim 1, wherein the first data are received through electronic mail.

6. The method for optimizing investments of claim 1, wherein the first data are received through entry on a computerized form.

7. The method for optimizing investments of claim 1, wherein the first and second investments are made by different business units of the organization.

8. A system for optimizing investments proposed by at least one business unit within an organization, said system comprising:
    a processor operable to calculate first data predicting the performance of a first investment using at least one global assumption relating to an organization and actual data describing the performance of at least one other investment;
    a database in communication with the processor, operable to store second data relating to a second investment;
    said processor further operable to form comparison data by comparing at least one metric computed from the first data to at least one metric computed from the second data, wherein the at least one metric computed from the first data and the at least one metric computed from the second data are both at least one of a financial metric and a strategic metric; and
    said processor further operable to determine whether to approve the first investment based at least in part on the comparison data.

9. The system for optimizing investments of claim 8, wherein the database is further operable to update the actual data.

10. The system for optimizing investments of claim 8, wherein the database is further operable to store the at least one global assumption.

11. The system for optimizing investments of claim 8, wherein the processor is further operable to receive data through electronic mail.

12. The system for optimizing investments of claim 8, wherein the processor is further operable to receive data through entry on a computerized form.

13. The system for optimizing investments of claim 8, wherein the database is further operable to store the approval status of the investments.

14. The system for optimizing investments of claim 8, wherein the first and second investments are made by different business units of the organization.

15. A computer program product comprising a computer-usable medium having control logic stored therein for causing a computer to optimize investments proposed by at least one business unit within an organization, said control logic comprising:

first computer readable program code means for causing the computer to store first data predicting the performance of an investment in a database, the first data being calculated using at least one global assumption relating to an organization and actual data describing the performance of at least one other investment;

second computer readable program code means for causing the computer to retrieve second data relating to a second investment from the database;

third computer readable program code means for causing the computer to form comparison data by comparing at least one metric computed from the first data to at least one metric computed from the second data, wherein the at least one metric computed from the first data and the at least one metric computed from the second data are both at least one of a financial metric and a strategic metric; and fourth computer readable program code means for causing the computer to determine whether to approve the first investment based at least in part on the comparison data.

16. The computer program product of claim 15, further comprising:

fifth computer readable program code means for causing the computer to update the actual data and store the updated actual data in the database.

17. The computer program product of claim 15, further comprising:

fifth computer readable program code means for causing the computer to store the at least one global assumption in the database.

18. The computer program product of claim 15, wherein the second investment is an existing investment.

19. The computer program product of claim 15, further comprising:

fifth computer readable program code means for causing the computer to receive the first data through electronic mail.

20. The computer program product of claim 15, further comprising:

fifth computer readable program code means for causing the computer to receive the first data through entry on a computerized form.

21. The computer program product of claim 15, wherein the first and second investments are made by different business units of the organization.

\* \* \* \* \*

UNITED STATES PATENT AND TRADEMARK OFFICE
CERTIFICATE OF CORRECTION

PATENT NO. : 7,761,359 B2
APPLICATION NO. : 11/256340
DATED : July 20, 2010
INVENTOR(S) : Anand K. Sanwal et al.

It is certified that error appears in the above-identified patent and that said Letters Patent is hereby corrected as shown below:

On the title page, item (75) Inventors, please delete "Jaonne L. Neidow" and insert therefor --Joanne L. Neidow--.

Signed and Sealed this

Twenty-first Day of September, 2010

David J. Kappos
*Director of the United States Patent and Trademark Office*